(12) United States Patent
Fantana et al.

(10) Patent No.: US 8,504,177 B2
(45) Date of Patent: Aug. 6, 2013

(54) ASSEMBLY FOR DIAGNOSING A DEVICE WITH MOVING PARTS

(75) Inventors: Nicolaie Fantana, Heidelberg (DE); Steffen Schmidt, Marburg (DE)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 13/396,395

(22) Filed: Feb. 14, 2012

(65) Prior Publication Data

US 2012/0209410 A1 Aug. 16, 2012

Related U.S. Application Data

(63) Continuation of application No. PCT/EP2010/004906, filed on Aug. 11, 2010.

(30) Foreign Application Priority Data

Aug. 14, 2009 (DE) .......................... 10 2009 037 302

(51) Int. Cl.
*G05B 21/02* (2006.01)
*G05B 15/00* (2006.01)

(52) U.S. Cl.
USPC ........................................... 700/73; 700/258

(58) Field of Classification Search
None
See application file for complete search history.

(56) References Cited

U.S. PATENT DOCUMENTS

| 7,316,170 | B2 * | 1/2008 | Bader et al. ................... 73/865.9 |
| 7,603,200 | B2 * | 10/2009 | Bader et al. ................... 700/245 |
| 2005/0049801 | A1 * | 3/2005 | Lindberg et al. ............... 702/34 |
| 2006/0033462 | A1 | 2/2006 | Moridaira |
| 2006/0085092 | A1 | 4/2006 | Redecker et al. |
| 2010/0094462 | A1 * | 4/2010 | Sugihara et al. .............. 700/258 |

FOREIGN PATENT DOCUMENTS

EP          1 650 540 A2    4/2006

OTHER PUBLICATIONS

International Search Report (PCT/ISA/210) issued on Oct. 26, 2010, by European Patent Office as the International Searching Authority for International Application No. PCT/EP2010/004906.
Written Opinion (PCT/ISA/237) issued on Oct. 26, 2010, by European Patent Office as the International Searching Authority for International Application No. PCT/EP2010/004906.
K.K. Tan et al., "Distributed fault detection in industrial system based on sensor wireless network", Computer Standards & Interfaces, Mar. 1, 2009, pp. 573-578, vol. 31, No. 3.

* cited by examiner

*Primary Examiner* — Ryan Jarrett
(74) *Attorney, Agent, or Firm* — Buchanan Ingersoll & Rooney PC (57) ABSTRACT

The invention is based on refining and developing an arrangement such that reliable diagnosis of the state and/or of the operating parameters of an apparatus can be performed inexpensively.

21 Claims, 11 Drawing Sheets

ASSEMBLY FOR DIAGNOSING A DEVICE WITH MOVING PARTS

RELATED APPLICATION

This application claims priority as a continuation application under 35 U.S.C. §120 to PCT/EP2010/004906, which was filed as an International Application on Aug. 11, 2010 designating the U.S., and which claims priority to German Application 10 2009 037 302.0-31 filed in Germany on Aug. 14, 2009. The entire contents of these applications are hereby incorporated by reference in their entireties.

FIELD

The invention relates to an arrangement of a data processing installation having a computer and at least one apparatus having a control device, wherein the apparatus has moving parts which are articulated to connection points on a fixed basic body or to further moving parts.

BACKGROUND INFORMATION

The prior art already discloses a multiplicity of apparatuses having moving parts. The moving parts may be in the form of cogs, rollers, shafts or gripper arms. The apparatuses may be in the form of industrial robots, conveyor belts or in the form of comprehensive production installations, for example. The apparatuses may furthermore include control elements, drive elements or communication means.

Alternatively, even larger systems are known which comprise a plurality of said apparatuses. In this case, the individual apparatuses are connected to one another for the purpose of implementing one or more work steps. Such systems are used in large conveyor installations, complex drives or in production lines.

Against this background, what are known as indoor systems having moving parts are known which are in the form of automatic process chains in the metal-processing industry, the automobile industry, the food industry or the paper industry, for example. What are known as outdoor systems are used in the construction industry or in mining, for example.

Apparatuses having moving parts frequently extend into many different areas of a technical installation and therefore exhibit a large physical extent. Furthermore, such apparatuses have a complex structure and frequently include a large number of moving parts. The apparatuses often perform complicated work steps which are successive and/or coincide with one another in time.

In order to safeguard error-free and reliable operation of the apparatuses, these often need to be monitored and checked at different locations at the same time. The known apparatuses already usually have one or more apparatus-internal memories which are used to store data or signals.

In order to check and diagnose such complex apparatuses reliably, it is desirable to capture not only the already stored data and signals but also further data from the apparatuses, however. To this end, the apparatuses currently need to be upgraded with complex test superstructures.

SUMMARY

An arrangement is disclosed for diagnosing a device with moving parts, comprising: a data processing installation having a computer; at least one apparatus having a control device, wherein the apparatus has moving parts which are articulated to connection points on a fixed basic body or to further moving parts; at least one sensor device which is wireless and secured in position on a connection point or on a moving part for capturing physical data from the respective moving part and transmitting said data wirelessly to the computer, wherein the at least one sensor device is configured to capture and transmit accelerations and/or temperatures and/or light and/or torques and/or noise and/or chemical substances in the environment and/or also voltages and/or currents; means for providing a temporary connection, during operation, between the computer and the control device to control motion sequences of the apparatus and to simultaneously read the data and to capture the control device time from the control device such that a time synchronization will be performed between the computer and the control device; a synchronization module synchronizing control device time and sensor device times; and a diagnosis device for analyzing the captured data, wherein time intervals and time differences are calculated and are compared with model data.

BRIEF DESCRIPTION OF THE DRAWINGS

In conjunction with the explanation of preferred exemplary embodiments of the invention with reference to the drawings, refinements and developments of the teaching are also explained.

In the drawing.

DETAILED DESCRIPTION

The present disclosure is based on refining and developing an arrangement such that reliable diagnosis of the state and/or of the operating parameters of the apparatus can be performed inexpensively.

Accordingly, an arrangement is characterized by at least one sensor device which is wireless and secured in position on a connection point or on a moving part itself.

According to an exemplary embodiment, it has first of all been recognized that precisely apparatuses having moving parts need to be inspected at quite particular, critical connection points in order to ensure proper operation thereof. In that case, it has been recognized that a service engineer or service technician is easily able to position passive or active wirelessly data-transmitting sensor devices at particular, empirically critical connection points without performing complex wiring in a complex system of apparatuses. The normal working operation of an apparatus or a system of apparatuses is not disrupted by the capture of data for a diagnosis. In addition, it has been recognized that wirelessly data-transmitting sensor devices can communicate both with one another within the context of a sensor network and with further network subscribers, for example by radio and/or infrared and/or audibly and/or by ultrasound. Finally, it has been recognized that the sensor devices can easily run test motion sequences which permit reliable and easy diagnosis of the state and the operating parameters of the apparatus.

In an exemplary refinement, the sensor device captures physical data from the moving parts and transmits said data wirelessly. To this end, one or more sensor devices are fitted to connection points or moving parts of an apparatus, particularly to an industrial robot. By way of example, the sensor device captures accelerations, temperatures, light, torques and/or noise, chemical substances in the environment, also voltages, currents, particularly motor currents, and torques, for example by means of transducers, and transmits these data. Audible signals and data can provide information about mechanical circumstances. Peaks in the noise level can convey contact by tooth edges in a gear and can indicate backlash, for example. Furthermore, changes in noise level can indicate bearing defects.

In an advantageous refinement, the sensor device is arranged at a marked position provided for a sensor device. In order to implement proper local associability for the sensor devices, said sensor devices are preferably arranged on connection points or moving parts which have been marked by the manufacturer of the apparatus at the factory. Alternatively, it is conceivable for the positions of the sensor devices used to be ascertained by computer using known reference co-ordinates. Equally, it is also possible to provide for the connection points to be provided with an RFID (radio frequency identification) tag or transponder.

As a further advantage, the sensor device captures the data at a preset challenge rate. This ensures permanent monitoring of the parts for which diagnosis is intended to be performed. Disruptions and faults which occur only occasionally or only in places can thus be captured reliably. The data are preferably captured during a preset period and are stored locally on the sensor device. During this period, a radio link from the sensor device is not active. This allows a higher challenge rate to be achieved. The data can be captured under time control, under event control or under process control. In the case of process control, the capture of the data is started by a control device in the apparatus.

In a further refinement, the data processing installation has a bridge unit to which at least one sensor device transmits captured data by means of a radio device. The bridge unit can be plugged onto a computer as an isolated component using an interface or can extend the control device of the apparatus. The bridge unit advantageously uses interfaces to transmit the transmitted data to a fixed or mobile computer. Advantageously, the bridge unit transmits the data continuously to a computer. There, the data are stored in a local database or in a local memory. It is also conceivable for the bridge unit to be in the form of a PCI or internal module. The bridge unit preferably forms a sensor network with a plurality of sensor devices, said sensor network comprising single-hop or multi-hop connections. This allows long distances to be bridged between the individual sensor devices and the bridge unit.

In one advantageous refinement, the bridge unit is fitted to or integrated in the control device in the apparatus. The bridge unit is preferably installed in the control device and connected to the power supply of the control device. The bridge unit can optionally be switched on and off. In this specific refinement, the control device is extended by the bridge unit. The extension allows the data from the sensor device and from the control device to be stored in an apparatus-internal memory. Thus, the data from the apparatus can be associated with the data from the sensor device on a temporal and functional basis. To this end, an apparatus-internal piece of software and a piece of hardware are advantageously provided in order to collect and store data from the sensor device in the control device. The hardware and software preferably use a continuous or periodic scan mode to look for sensor devices which are in range. As soon as a connection to the sensor devices found has been accepted, the sensor devices found are displayed on a display on the control device, for example in a pop-up window, or are signaled by flashing. Furthermore, it is possible for the sensor devices to be configured with prescribed settings by radio, automatically or by a mobile computer. This configuration is intended to adjust the sensor devices in respect of the data for which diagnosis is intended to be performed from the apparatus. Internal configuration data and configuration data which are typical of the respective apparatus are advantageously stored in the apparatus-internal memory.

In a further refinement, the bridge unit is fitted to or integrated in the computer. In this case, the bridge unit is preferably firmly connected to the computer. This allows the bridge unit to be brought close to an apparatus together with the computer in order to receive data by radio from the sensor devices or from the control device.

In a further refinement, the computer reads data captured by a sensor device and/or configures the sensor device. This can be done by means of radio contact or via an interface with the bridge unit. The computer can then analyze the captured data.

In a further refinement, the computer reads data from a control device in the apparatus and/or configures the control device. Advantageously, all essential data are buffer-stored in an apparatus-internal memory and can therefore be read as required using the computer. To this end, it is possible to set up a temporary connection between the computer and the control device which is wired or in the form of a radio link.

Against this background, the computer has a piece of software installed on it. The software can capture data from the sensor device or from a sensor network and data from a control device in the apparatus. The software allows the sensor devices and/or a control device in an apparatus to be configured. The software allows the apparatus and/or the sensor devices to be configured such that, by way of example, temporal data are captured or data are captured on the basis of events which occur. Furthermore, the software provides different modes of operation, such as continuous capture of data, command-controlled or event-controlled capture of data from the sensor devices and/or from the control device. In addition, the software allows the apparatus or a plurality of apparatuses to be controlled such that the moving parts thereof perform different motion sequences. This mode of operation is useful particularly when performing test motion sequences. In particular, such a test motion sequence is performed in an industrial robot.

In a further refinement, the computer contains a piece of software which analyzes the data received from the sensor device and/or data from the control device and outputs diagnosis results. The software preferably allows visual display and visual analysis of the data. Furthermore, the software allows analysis of the data and processing of measured signals. This permits rapid analysis and diagnosis of the state of the apparatus or of the moving parts thereof.

In a further refinement, the computer reads captured data from a plurality of sensor devices in different apparatuses and/or data from a plurality of control devices in different apparatuses. This allows one computer to be used to monitor a large number of apparatuses and to subject them to diagnosis.

In a further refinement, the computer configures a plurality of sensor devices in different apparatuses and/or configures a plurality of control devices in different apparatuses. This allows one computer to be used to actuate, monitor and subject to diagnosis a large number of apparatuses.

In an advantageous refinement, the computer is in the form of a mobile computer. A mobile computer for reading and forwarding data and control commands can easily be carried by a service engineer and be used for a diagnosis in situ. Such a computer can communicate with one or more control devices or with a plurality of sensor devices.

In a further refinement, the data processing installation has a central, external memory to which the computer transmits the data captured by a sensor device and/or data from the control device via the Internet. This allows data captured in highly ramified production installations or in outdoor systems to be transmitted to a very remote location and to be evaluated there. The central, external memory ensures permanent and secure storage of the data.

In a further refinement, the data from the control device and/or from the sensor device are transmitted by a radio repeater. This ensures that the data can all be transmitted to a computer even in the event of a disruption or interruption in the radio link. The radio repeater makes sense particularly when long distances are bridged between the computer and the apparatus.

In an advantageous refinement, the sensor device has a housing in and/or on which one or more sensors are held. The housing protects sensitive sensors and the wiring thereof with sensor boards, process boards, data memories and radio devices against environmental influences. The sensor device having one or more sensors can easily be secured in position by the housing on a connection point for the apparatus for which diagnosis is intended to be performed. In this context, it is conceivable for sensors for capturing currents, speeds, temperatures and noise to be held individually or in combination in or on the housing.

Advantageously, at least one acoustic sensor for capturing noise is held in or on the housing. An acoustic sensor can capture noise and vibrations from the moving parts or from a basic body of an apparatus. Furthermore, an acoustic sensor can capture noise from the environment.

Against this background, in a further refinement, a first acoustic sensor for capturing noise from the moving part is held in the housing and a second acoustic sensor for capturing ambient noise is held on the housing. This specific refinement allows the noise captured by the second acoustic sensor to be subtracted from the noise captured by the first acoustic sensor. This allows the noise and vibrations produced by the moving parts to be isolated and analyzed very exactly.

In a further refinement, at least one process board is held in the housing. The process board processes raw data and stores said data as data to be transmitted on a data memory. Furthermore, the process board controls the radio transmission of the data.

In a further refinement, the sensor device has a dedicated data memory. This means that the sensor device is independent of external memories and can capture and store data autonomously.

In a further refinement, the sensor device has a dedicated power supply. This specific refinement ensures that the supply of power to the apparatus or any fluctuations in current in the supply of power to the apparatus do not disrupt the sensors.

Advantageously, the sensor device is secured in position on the connection points of the apparatus magnetically or mechanically. This allows firstly rapid mounting and secondly easy detachment of the sensor device. To this end, the housing advantageously has a permanent magnet.

The sensor devices described here are fitted to or on the apparatus as required, for example during a service call or for the purpose of monitoring after a fault. To this end, the apparatus is briefly shut down and the sensor devices are fitted and switched on. Data are now collected using standard settings which are transmitted to the sensor devices wirelessly. The period for measuring/collecting data can also be stipulated by a standard setting. Alternatively, a mobile computer can also be used to stipulate a new configuration for the sensor devices. The standard settings can be altered using the mobile computer. When the sensor devices have been configured, collection of the data is started. Alternatively, in an automatic mode, collection of the data can start immediately after automatic configuration. In the latter case, it is merely necessary for the sensor devices to be fitted by the service engineer.

If the bridge unit extends the control device of the apparatus, the data are advantageously collected in an apparatus-internal memory in the control device. The period for measuring data can be stipulated as standard or can be set by the service engineer using the mobile computer.

The apparatus can operate in an operative/normal mode. When the period of operation has been stipulated, following a specific work sequence or following a course of test motion sequences, the collected data are read in using a mobile computer belonging to the service engineer. The data are collected, analyzed and assessed by the service engineer.

The sensor devices advantageously have a dedicated power supply, since they are fitted to the apparatus only temporarily. Data are advantageously read by a service engineer, who reads the data after a stipulated measurement time. The data can be read via a temporary connection which may be wired or in the form of a radio signal. The data are collected in the mobile computer, are stored, possibly analyzed and/or are sent to an external memory. In this case, both the data from the control device and the data from the sensor devices are read.

The sensor devices described here may also be fitted permanently to certain connection points. The connection points may be provided with a constant supply of power and with a space for the sensor devices. The sensor devices can be fitted to the apparatus optionally during manufacture, as upgrade components or as required and may remain there permanently or temporarily.

Figure 1:
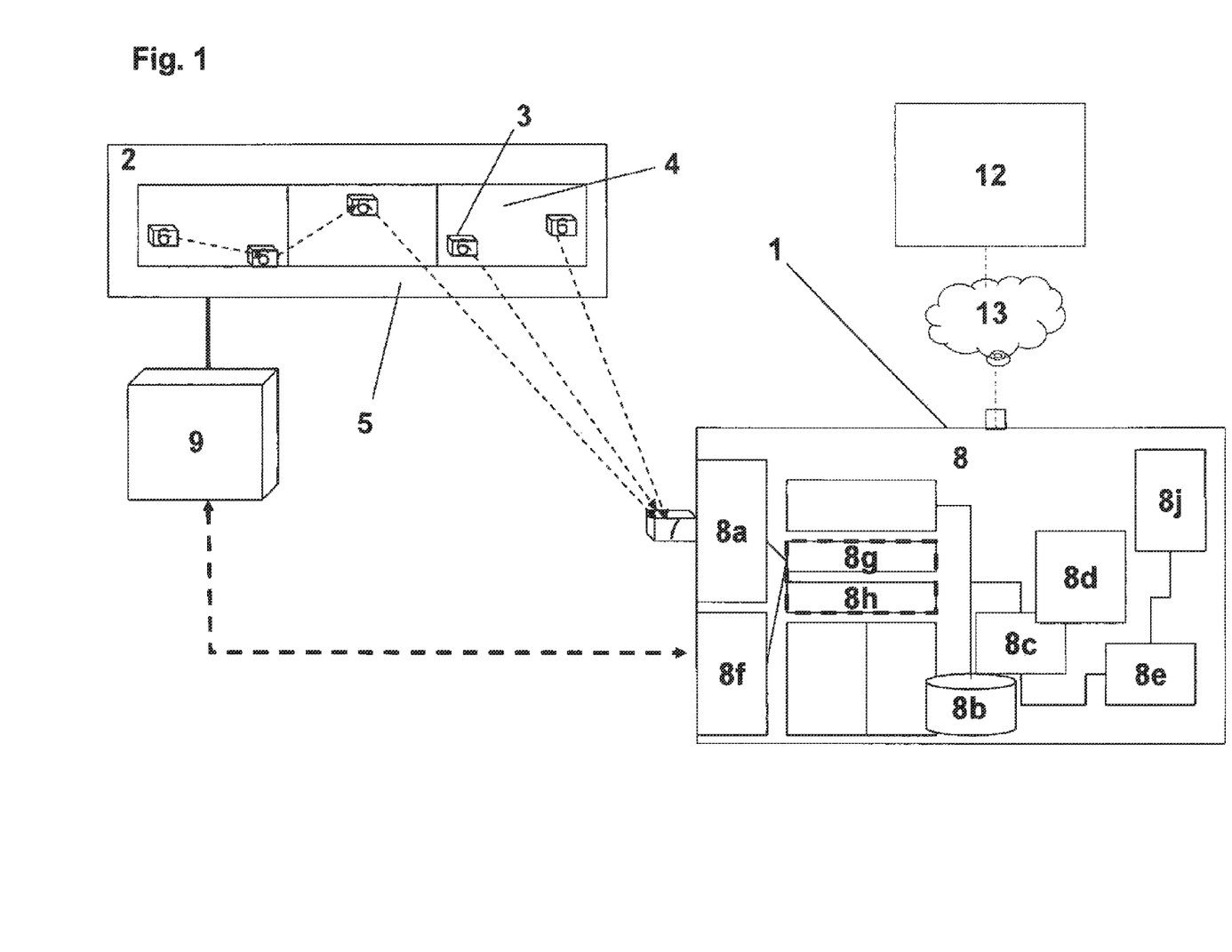
FIG. 1 shows a schematic view of an arrangement in which a mobile computer is used for the diagnosis of an apparatus.

FIG. 1 shows an exemplary arrangement, comprising a data processing installation 1 and at least one apparatus 2 which has moving parts 3, wherein the moving parts 3 are articulated to connection points 4 on a fixed basic body 5 or to further moving parts 3. A plurality of wirelessly data-transmitting sensor devices 6 are secured in position on connecting points 4 or on moving parts 3 themselves and communicate with the data processing installation 1.

A plurality of sensor devices 6 are secured in position on the moving parts 3 and capture physical data from the moving parts 3. The sensor devices 6 are arranged at marked positions provided for the sensor devices 6. The sensor devices 6 capture data at a preset challenge rate. The data processing installation 1 has a bridge unit 7 to which the sensor devices 6 transmit captured data. The data are transmitted by radio.

The arrangement shown in FIG. 1 can be used in the following exemplary manner:

A service engineer mounts the sensor devices 6 on the provided markers on the apparatus 2 and sets up the connection between the sensor devices 6 and the mobile computer 8. A wireless sensor network which has single-hop or multi-hop connections is set up. The mobile computer 8 is additionally connected to a control device 9 in the apparatus 2 in order to capture the control device time and further data. Time synchronization is then performed between the computer 8 and the control device 9. A test motion sequence is prepared and stored, which involves setting which data are intended to be read from the control device 9. The control device 9 is then configured. A start signal is sent to the control device 9 and to the sensor devices 6. The data from the sensor devices 6 and from the control device 9 are captured by a data capture block 8a and are stored in a data memory 8b. The data are presented to the service engineer, wherein a diagnosis device 8c is used for evaluation. The data are analyzed by using a comparison module 8d to compare captured time intervals with model data. A report module 8e then prepares a report and sends the data by e-mail to a central, external memory 12 via the Internet 13 using a forwarding module 8j.

Between the control device 9 and the computer 8 there is a temporary connection which may be wired or wireless. It can be set up on an interface 8f using WLAN, Bluetooth or Ethernet. It is used to control the motion sequences of the apparatus 2 and to simultaneously read the data from the control device 9. It is possible to capture currents, voltages, positions, forces and similar data. The motion sequence is started by a trigger 8g. The control device time and sensor device times are synchronized by a synchronization module 8h.

Figure 2:
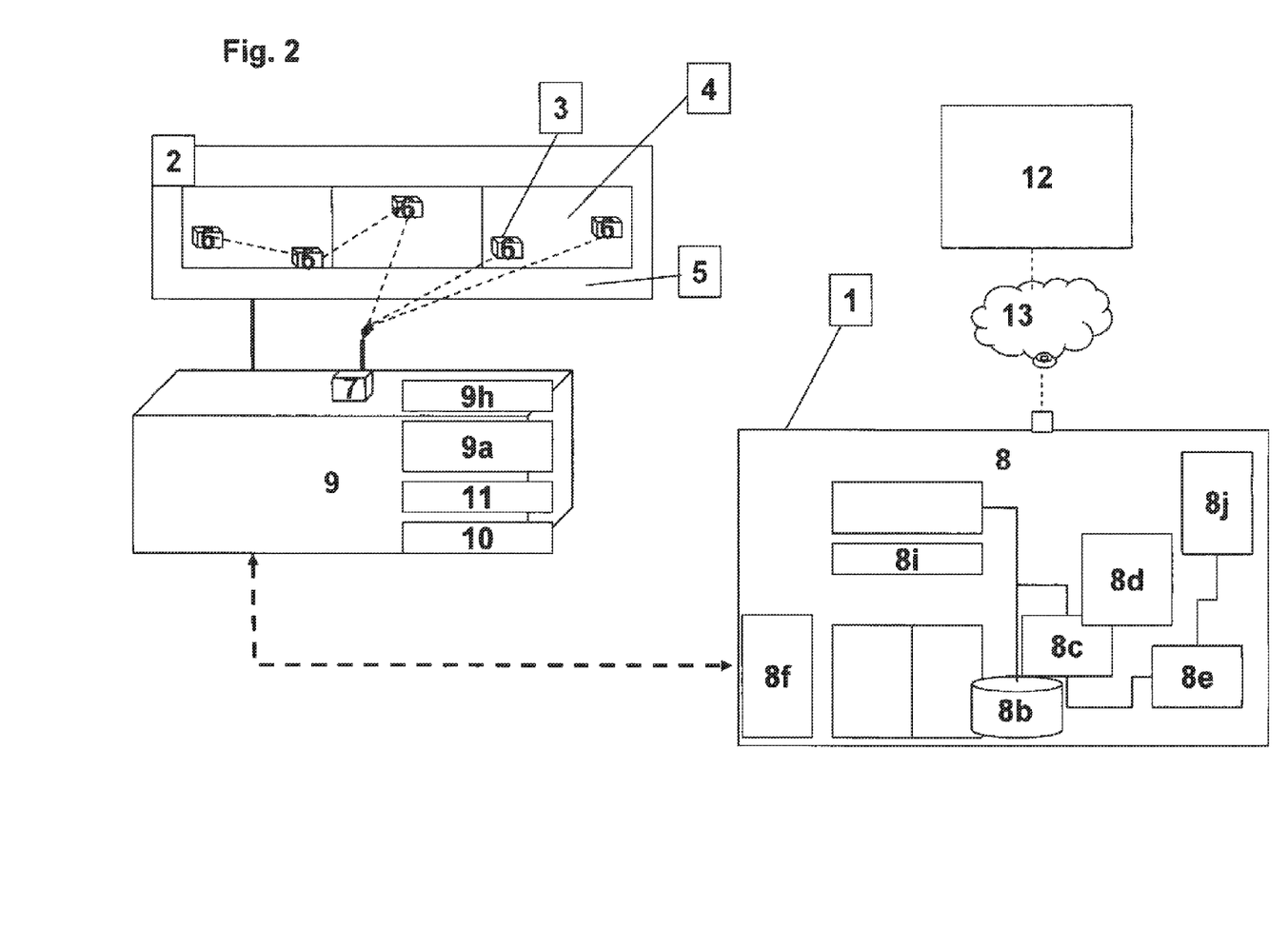
FIG. 2 shows a schematic view of an exemplary arrangement in which the control device in the apparatus has data capture elements integrated in it.

FIG. 2 shows a bridge unit 7 integrated in the control device 9, an apparatus-internal data capture block 9a, an apparatus-internal synchronization module 9h, an integrated apparatus-internal memory 10 and an apparatus-internal piece of software 11. The apparatus-internal software 11 receives configuration and measurement commands and implements said commands on the apparatus 2.

To this end, between the control device 9 and the computer 8 there is a temporary connection which may be wired or wireless. It can be set up on an interface 8f using WLAN, Bluetooth or Ethernet. The connection is used for configuring the apparatus 2, particularly for setting the data which are to be captured. Furthermore, the configuration covers the manner in which capture and measurement are intended to be performed. The capture of the data can be started under time control or under event control. The connection is also used for transmitting the data captured in the apparatus-internal data capture block 9a. The apparatus-internal data capture block 9a is integrated in the control device 9. The mobile computer 8 is used for configuring, reading the captured data and analyzing said data. As described in FIG. 1, the data can be analyzed on a mobile basis and forwarded to an external memory 12 via the Internet 13.

The arrangement shown in FIG. 2 can be used as follows:

The wireless sensor devices 6 are either arranged on the apparatus 2 permanently or can complement the apparatus 2 as upgrade elements. When the sensor devices 6 are mounted permanently, the apparatus 2 preferably has an inexpensive monitor system. The sensor network of the sensor devices 6 may have single-hop or multi-hop connections. The apparatus-internal data capture elements are provided permanently or can be retrofitted. These are arranged on the control device 9.

The service engineer uses a mobile computer 8 in order to transmit configurations and data capture commands to the control device 9. Furthermore, it is possible to set whether the data capture takes place under time control or under event control. The data capture is preceded by time synchronization; commands for data storage, data capture duration and the like are set. In this context, it is conceivable to perform a specific test motion sequence or to monitor working operation.

The data are stored in the apparatus-internal memory 10 for later use on the mobile computer 8. The service engineer can be informed by a message module 8i when the captured data can be read from the control device 9. It is also conceivable for the service engineer to leave the position at which the mobile computer 8 is set up and for the data capture to take place automatically. The captured data are then read by the returning service engineer and are transmitted to the mobile computer 8. The data are presented to the service engineer. In this case, a diagnosis device 8c is used for analyzing the data. To analyze the data, time intervals and time differences are calculated and are compared with typical model data. The report module 8e prepares reports and can forward said reports to a central, external memory 12 via the Internet 13 using a forwarding module 8j.

Figure 3:
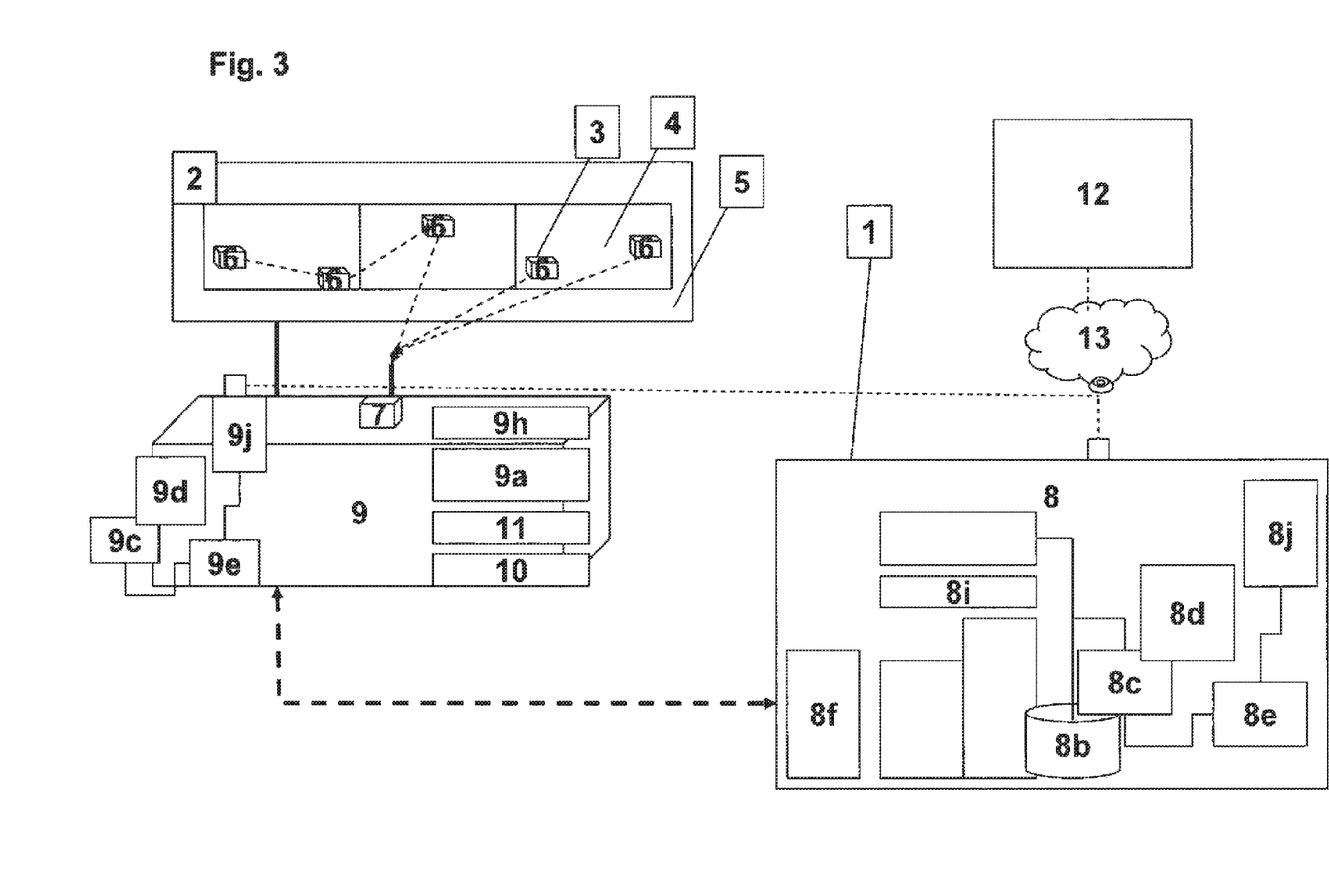
FIG. 3 shows a schematic view of an exemplary arrangement in which the control device in the apparatus has an apparatus-internal diagnosis device integrated in it.

FIG. 3 shows that the control device 9 and the computer 8 have a temporary connection between them which may be wired or wireless. Said connection can be set up on an interface 8f using WLAN, Bluetooth or Ethernet. The connection is used for configuring the apparatus 2, particularly for setting the data which are to be captured. Furthermore, the configuration covers the manner in which capture and measurement are intended to take place. The capture of the data can be started under time control or under event control.

The control device 9 has an apparatus-internal data capture block 9a, an apparatus-internal diagnosis device 9c, an apparatus-internal comparison module 9d, an apparatus-internal report module 9e, an apparatus-internal synchronization module 9h and an apparatus-internal forwarding module 9j integrated in it.

The arrangement shown in FIG. 3 is of similar design to the arrangement shown in FIG. 2. In this case, however, the mobile computer 8 is used only for the configuration and verification of the data by the service engineer.

The mobile computer which was used in FIGS. 1 to 3 can also be used in order to communicate with a multiplicity of apparatuses 2 as shown in FIGS. 1 to 3.

Figure 4:
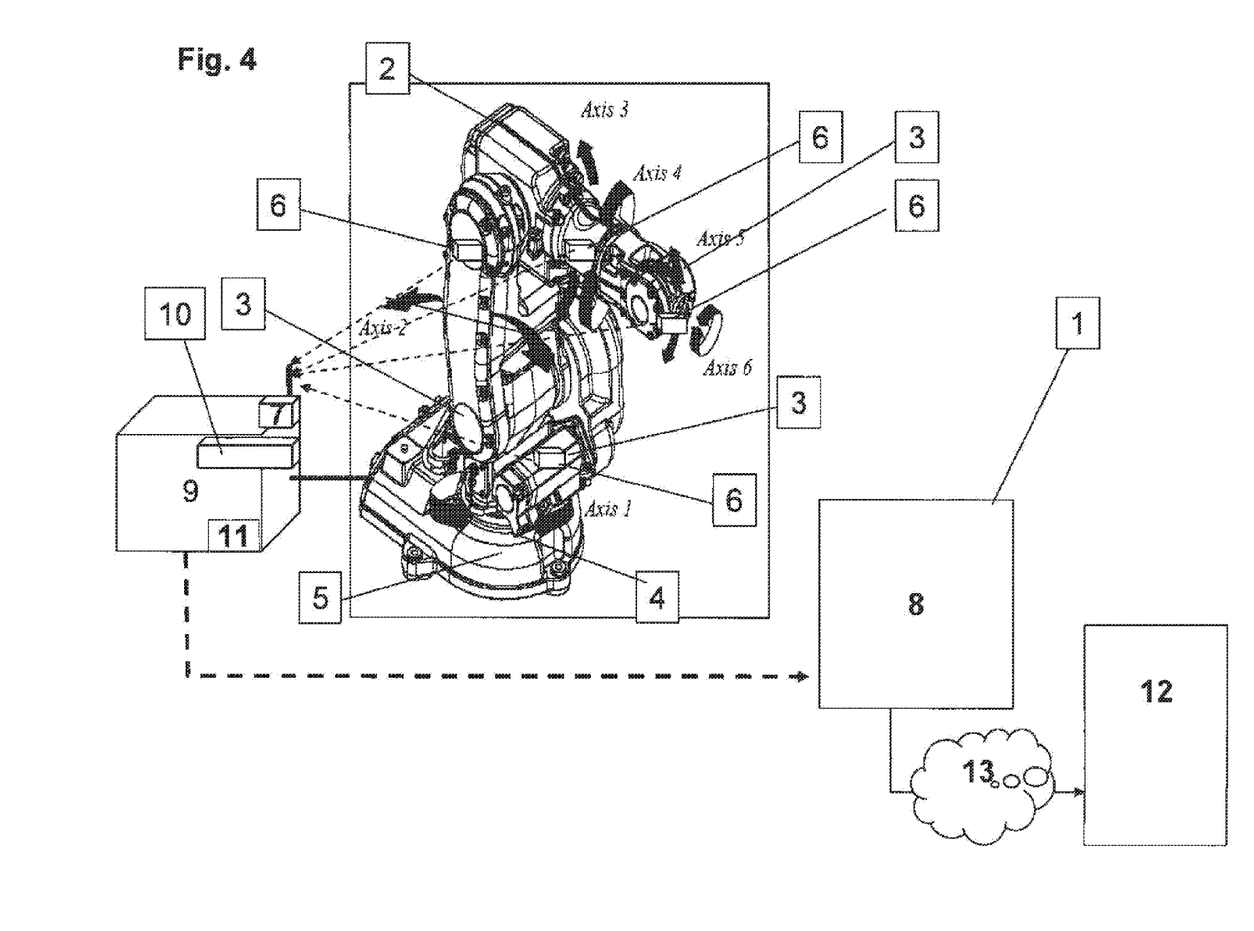
FIG. 4 shows a schematic illustration of an exemplary arrangement which has an apparatus having moving parts and has a data processing installation, wherein the apparatus is in the form of an industrial robot and has a control device which is extended by the bridge unit.

FIG. 4 shows an arrangement, comprising a data processing installation 1 and at least one apparatus 2 which has moving parts 3, wherein the moving parts 3 are articulated to connection points 4 on a fixed basic body 5 or to further moving parts 3. Quite specifically, the apparatus 2 is in the form of an industrial robot. The moving parts 3 are in the form of arms or manipulators on the industrial robot. The industrial robot is an articulated arm robot. A plurality of wirelessly data-transmitting sensor devices 6 are wireless and secured in position on connection points 4 or on moving parts 3 themselves and communicate with the data processing installation 1.

A plurality of sensor devices 6 are secured in position on the moving parts 3 and capture physical data from the moving parts 3. The sensor devices 6 are arranged at marked positions provided for the sensor devices 6. The sensor devices 6 capture data at a preset challenge rate.

The data processing installation 1 has a bridge unit 7 to which the sensor devices 6 transmit captured data. The data are transmitted by radio.

The data processing installation 1 has a computer 8 which reads the data transmitted via the sensor devices. The bridge unit 7 is integrated in the control device 9 in the apparatus 2. The control device 9 has an apparatus-internal memory 10 and a piece of software 11 for storing the data obtained from the bridge unit 7 and further data. The computer 8 also reads these further data from the control device 9 in the apparatus and is able to configure them. The connection between the computer 8 and the control device 9 is made by means of a cable or by means of an interface. A connection by means of radio, Bluetooth or WLAN is also conceivable.

The computer 8 contains a piece of software which analyses the data received from the sensor devices 6 and outputs diagnosis results. The computer 8 is in the form of a mobile computer. The data processing installation 1 comprises a central, external memory 12 to which the computer 8 transmits the data captured by the sensor devices 6 and/or further data from the control device 9 via the Internet 13. This can be accomplished by a LAN, WLAN or WWLAN connection.

Figure 5:
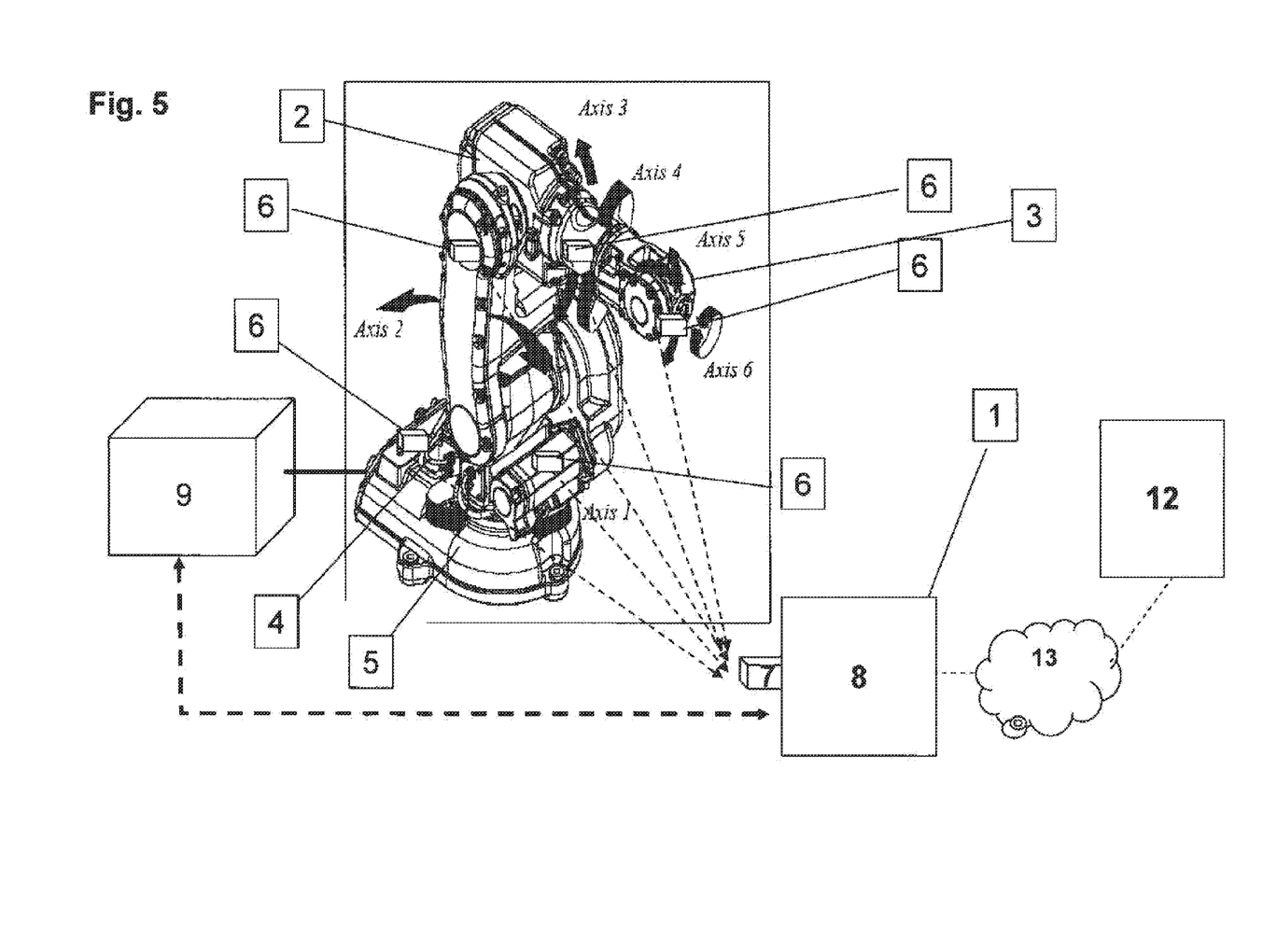
FIG. 5 shows a schematic illustration of an exemplary arrangement, wherein the bridge unit is associated with the computer in a data processing installation.

FIG. 5 shows an apparatus 2 on which a plurality of sensor devices 6 are arranged. In this case, the bridge unit 7 is associated directly with the mobile computer 8. The sensor devices 6 transmit the captured data to the bridge unit 7 by radio. The computer 8 contains a piece of software which analyzes the data received from the sensor devices 6 and outputs diagnosis results. The computer 8 is in the form of a mobile computer. The computer 8 transmits the data captured by the sensor devices 6 to the central, external memory 12 via the Internet 13. The computer 8 also reads further data from the control device 9 in the apparatus 2 and optionally analyzes and forwards said data. The connection between the computer 8 and the control device 9 is made by means of a cable or by means of an interface. A connection by means of radio, Bluetooth or WLAN is also conceivable.

Figure 6:
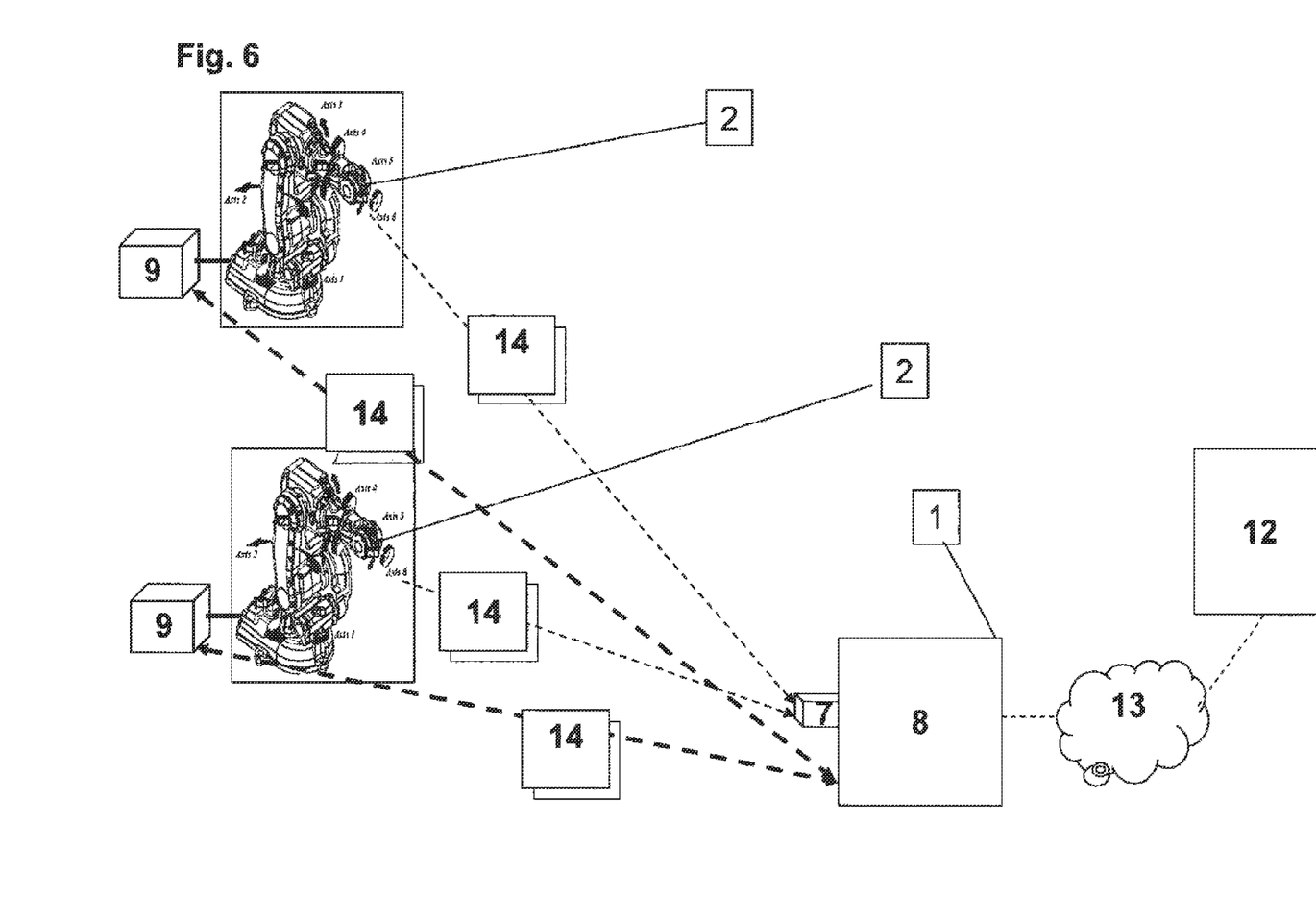
FIG. 6 shows a schematic illustration of an exemplary arrangement which comprises a plurality of industrial robots, wherein the data therefrom are captured by a mobile computer with which the bridge unit is associated.

FIG. 6 shows a computer 8 which reads data from a plurality of control devices 9 in different apparatuses 2 and captures data from a plurality of sensor devices 6 in the different apparatuses 2. In this case, the bridge unit 7 is directly associated with the computer 8. The data are transmitted to the bridge unit 7 by the sensor devices 6 by radio. The connection between the computer 8 and the control devices 9 is likewise made by means of radio. A connection by means of cable, by means of interfaces, Bluetooth or WLAN is also conceivable. The transmission of the data from the control devices 9 and the data from the sensor devices 6 to the computer 8 is assisted by radio repeaters 14. The data from a plurality of apparatuses 2 are collected by the software on the computer 8, are conditioned and stored locally on the computer and/or are forwarded to a central, external memory 12. Furthermore, the data from a plurality of apparatuses 2 are analyzed by the software on the computer 8. The software can also compare the data with one another, with historical data or with a reference system.

Figure 7:
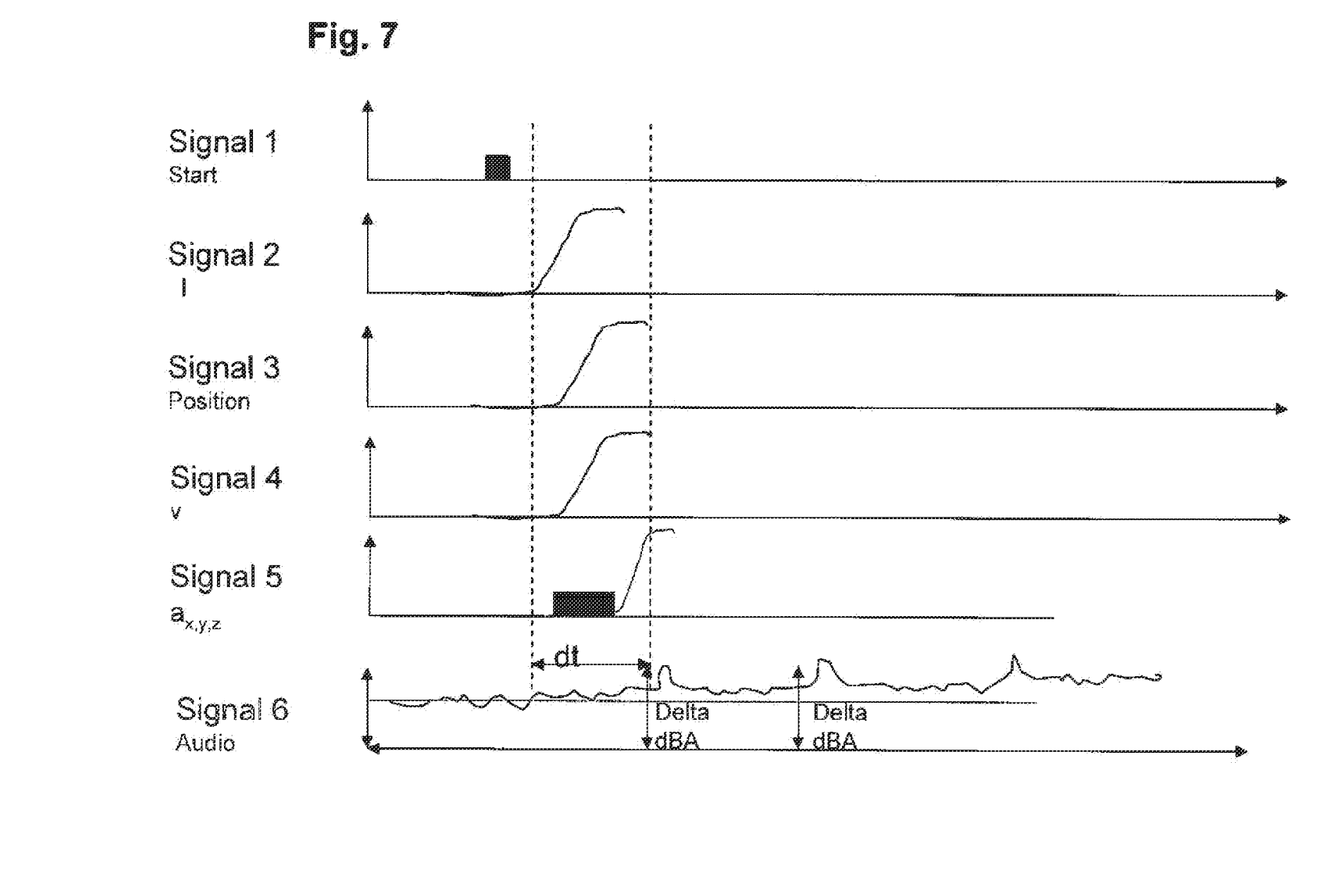
FIG. 7 shows a schematic illustration of exemplary data captured and transmitted by a sensor.

FIG. 7 schematically shows the data transmitted by a sensor device 6 using signals. Signal 1 represents a start command for a motion sequence, which command can be given automatically or manually. Signal 2 represents a current I measured by a sensor, signal 3 represents a local position, signal 4 represents a speed v and signal 5 represents the acceleration a of a moving part 3. The values of the acceleration a provide information about the start and the end of the motion sequence. Signal 6 represents captured audio signals on the connection point 4 or on the moving part 3, on which the sensor device 6 is fitted. In addition, the end of a motion sequence can be measured and transmitted as a signal. The command to terminate a measurement can be given automatically or manually. The time intervals dt can provide information about the backlash in the gear of an industrial robot. Together with the signals 1 to 5, the signal 6 provides additional information for diagnosis for the apparatus 2. The signal 6 may be characteristic of motion reversals, backlash, bearing defects or running noise during the rotation about an axle. The noise peaks, which are denoted by "Delta dBA", can indicate the aforementioned effects.

The motion sequences for individual moving parts 3 are measured and assessed during ongoing work processes in the apparatus 2. Alternatively, a test motion sequence can be run which is used for diagnosis purposes. This allows better recognition and analysis of particular situations. A test motion sequence may involve approaching co-ordinates using a manipulator in the apparatus 2, said manipulator being run at high speed and decelerated over a short distance for a high mass.

Figure 8:
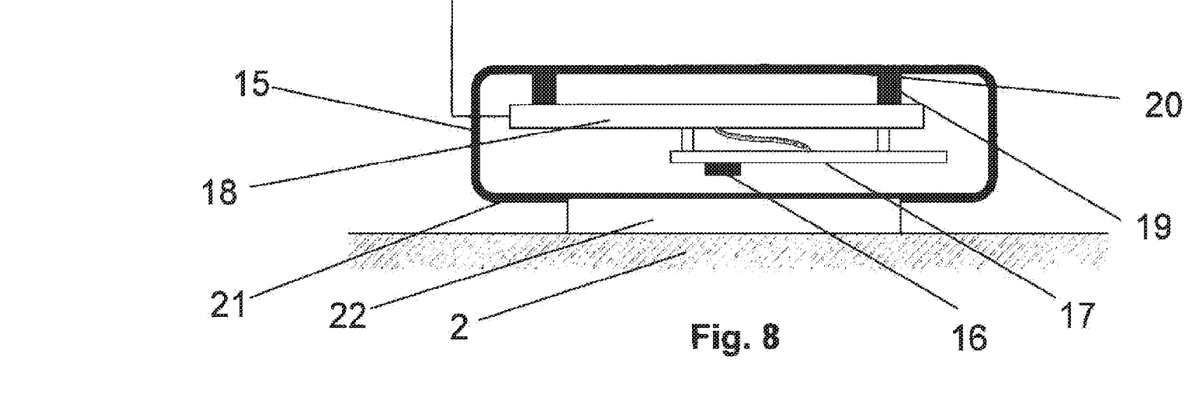
FIG. 8 shows a schematic illustration of a sensor device having an exemplary housing.

FIG. 8 shows a sensor device 6 which has a housing 15 in which a sensor 16 is held. Specifically, a first acoustic sensor 16 is held which is able to capture noise or vibrations from a moving part 3. The first acoustic sensor 16 is fitted on a sensor board 17 which is wired up to a process board 18 arranged parallel above it. The process board 18 is secured in position on the top 20 of the housing 15 by mounting means 19. The sensor board 17 and the process board 18 are electrically and mechanically connected to one another.

The underside 21 of the housing has a permanent magnet 22 fitted to it. The permanent magnet 22 can be secured in position on the metal apparatus 2 or on the moving parts 3 thereof.

Figure 9:
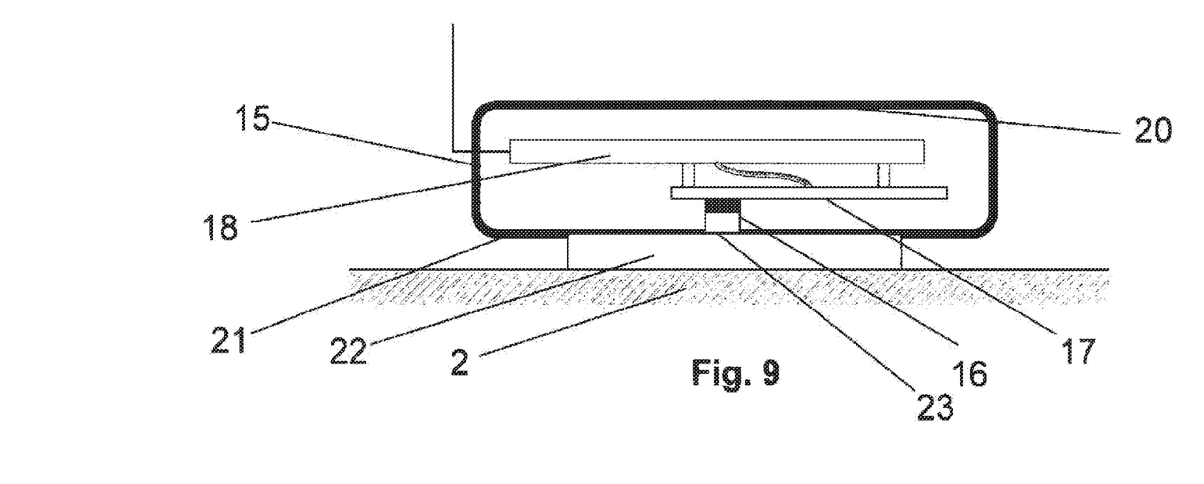
FIG. 9 shows a schematic illustration of a sensor device having an exemplary housing, wherein an acoustic sensor is arranged on a structure-borne sound transmission body.

FIG. 9 shows a sensor device 6 in which the first acoustic sensor 16 is secured in position on the underside 21 of the housing 15 by a structure-borne sound transmission body 23. The sensor board 17 and the process board 18 are arranged above one another and are secured in position on the housing 15 by the structure-borne sound transmission body 23 and the first acoustic sensor 16. The sensor board 17 and the process board 18 are electrically and mechanically connected.

Figure 10:
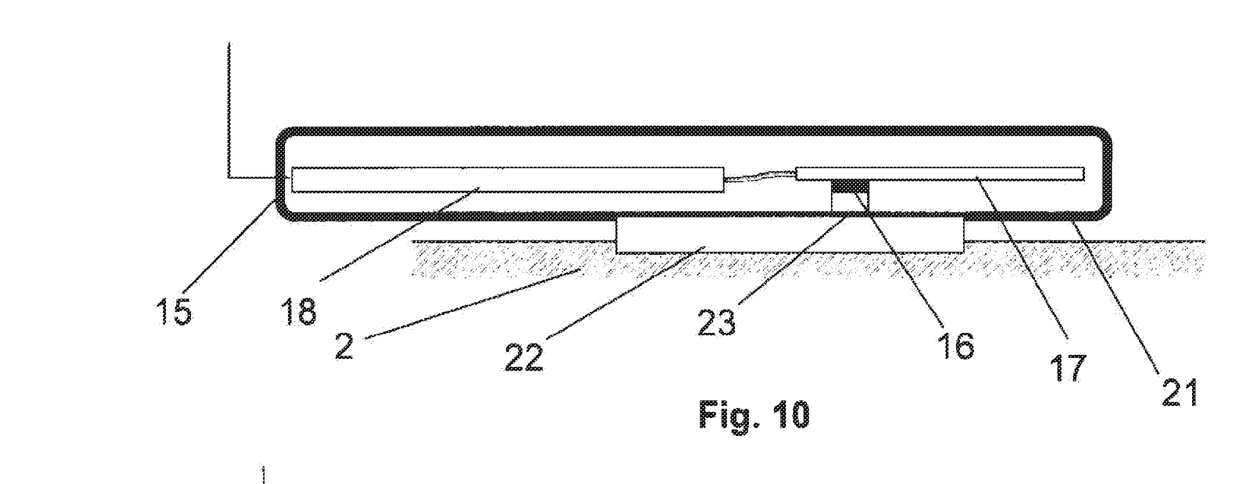
FIG. 10 shows a schematic illustration of a sensor device having an exemplary housing which contains a process board and a sensor board in a longitudinally aligned arrangement.

FIG. 10 shows a sensor device 6 in which the sensor board 17 is essentially in a longitudinally aligned arrangement relative to the process board 18. The sensor board 17 and the process board 18 are electrically connected, but mechanically decoupled. The sensor board 17 is secured in position on the housing 15 by the structure-borne sound transmission body 23 and the first acoustic sensor 16.

Figure 11:
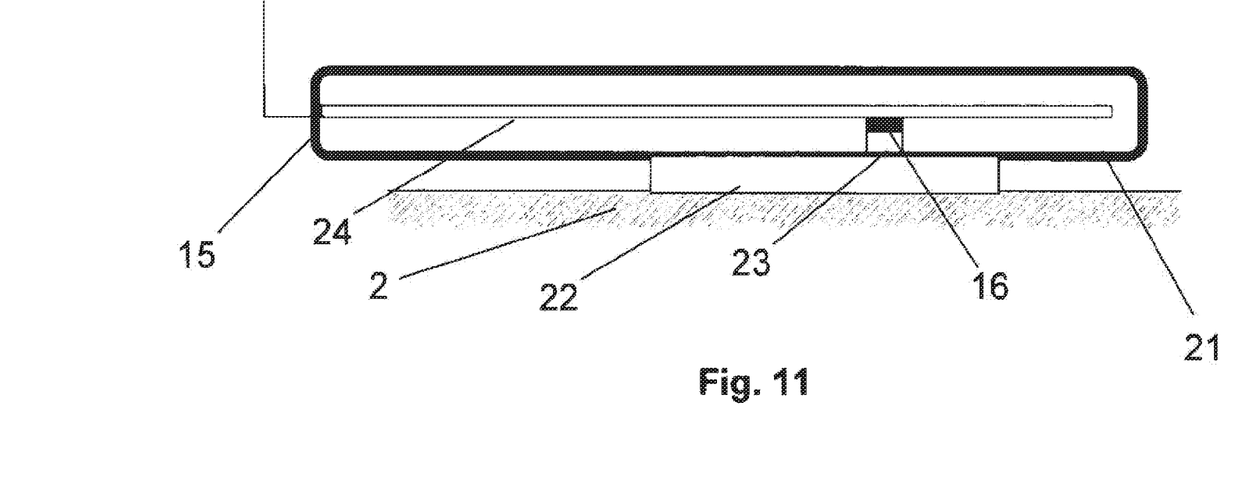
FIG. 11 shows a schematic illustration of a sensor device having an exemplary housing in which a sensor board and a process board are of integral design.

FIG. 11 shows a sensor device 6, in the housing 15 of which only one board 24 is held. In this case, the process board 18 and the sensor board 17 are of integral design. The board 24 is secured in position on the housing 15 by the structure-borne sound transmission body 23 and the first acoustic sensor 16.

Figure 12:
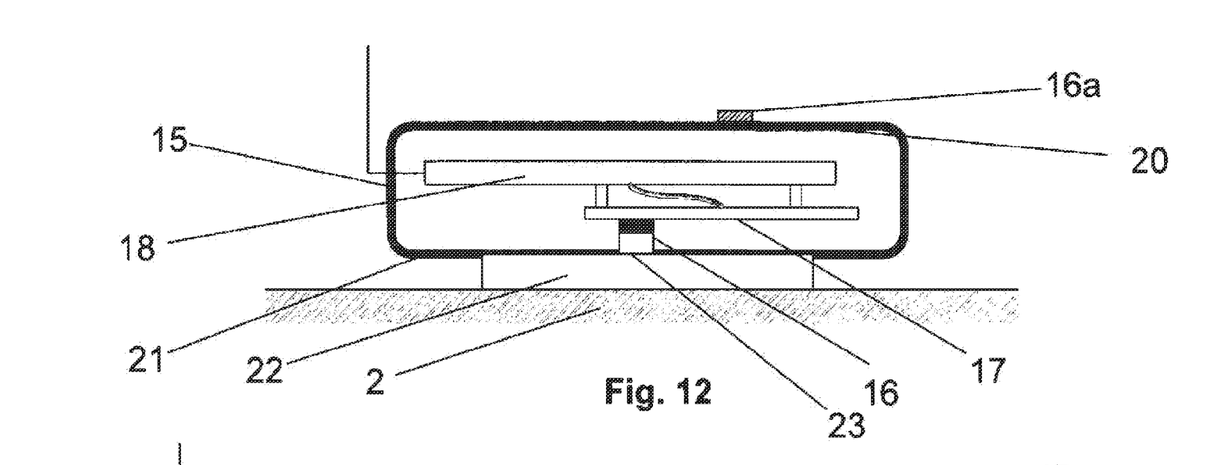
FIG. 12 shows a schematic illustration of a sensor device having an exemplary housing, the outside of which has an acoustic sensor for capturing ambient noise arranged on it.

FIG. 12 shows a sensor device 6 in which the first acoustic sensor 16 is secured in position on the underside 21 of the housing 15 by a structure-borne sound transmission body 23. The sensor board 17 and the process board 18 are arranged above one another and are secured in position on the housing 15 by the structure-borne sound transmission body 23 and the first acoustic sensor 16. In this arrangement, the first acoustic sensor 16 for capturing noise from the moving part 3 is held in the housing 15 and a second acoustic sensor 16a for capturing ambient noise is held on the outside of the housing 15.

Figure 13:
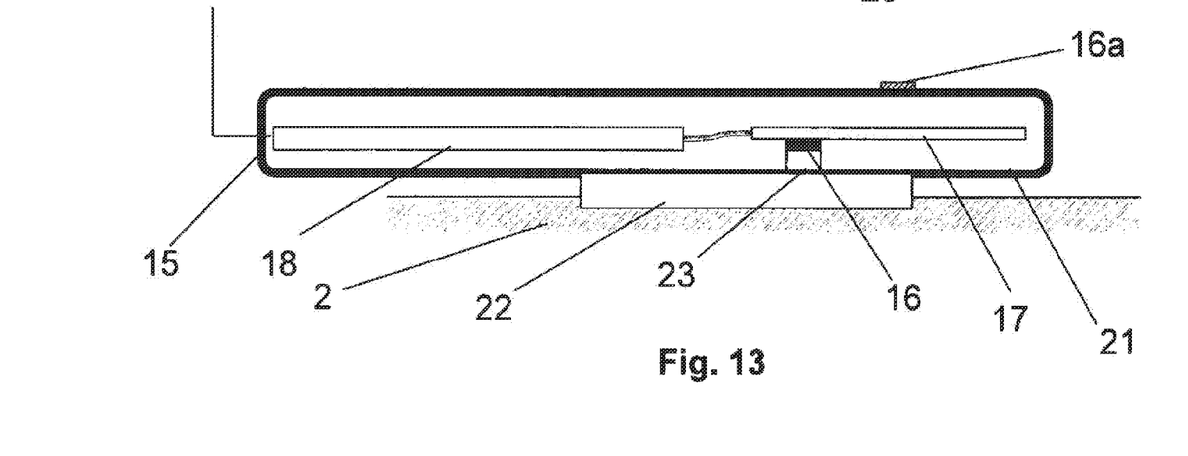
FIG. 13 shows a schematic illustration of a sensor device having an exemplary housing, the outside of which has an acoustic sensor for capturing ambient noise arranged on it, wherein a process board and a sensor board are in a longitudinally aligned arrangement.

FIG. 13 shows a sensor device 6 in which the sensor board 17 is essentially in a longitudinally aligned arrangement relative to the process board 18. The sensor board 17 and the process board 18 are electrically connected, but mechanically decoupled. The sensor board 17 is secured in position on the housing 15 by the structure-borne sound transmission body 23 and the first acoustic sensor 16. In this arrangement, the first acoustic sensor 16 for capturing noise from the moving part 3 is held in the housing 15 and the second acoustic sensor 16a for capturing ambient noise is held on the outside of the housing 15.

Figure 14:
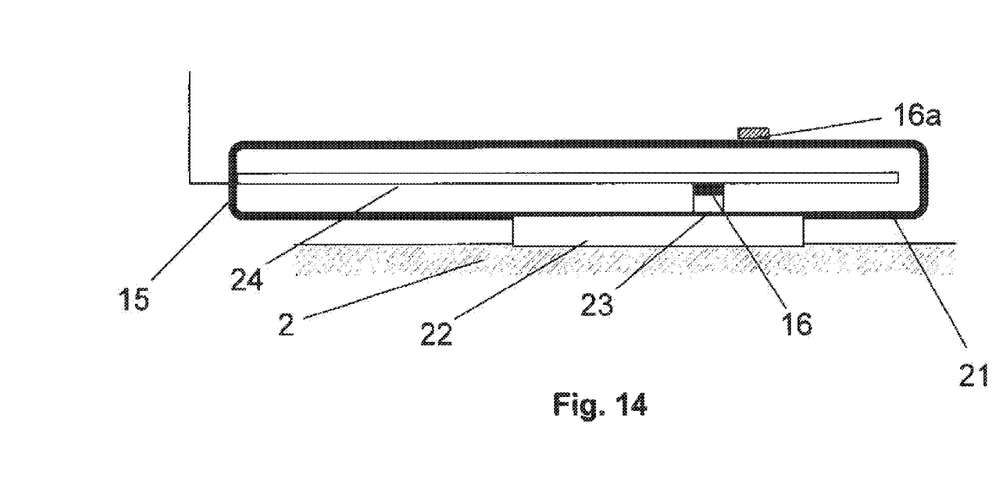
FIG. 14 shows a schematic illustration of a sensor device having an exemplary housing, the outside of which has an acoustic sensor for capturing ambient noise arranged on it, wherein a sensor board and a process board are of integral design.

FIG. 14 shows a sensor device 6, in the housing 15 of which only one board 24 is held. In this case, the process board 18 and the sensor board 17 are of integral design. The board 24 is secured in position on the housing 15 by the structure-borne sound transmission body 23 and the first acoustic sensor 16. In this arrangement, the first acoustic sensor 16 for capturing noise from the moving part 3 is held in the housing 15 and the second acoustic sensor 16a for capturing ambient noise is held on the outside of the housing 15.

Figure 15:
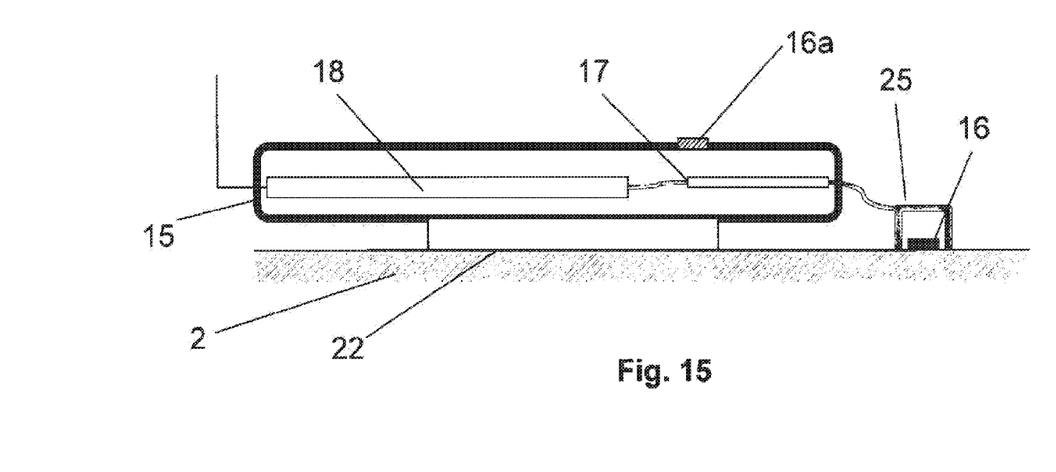
FIG. 15 shows a schematic illustration of a sensor device having an exemplary housing, the outside of which has a second acoustic sensor for capturing ambient noise arranged on it, wherein a first acoustic sensor is held outside of the housing in a chamber.

FIG. 15 shows a sensor device 6 in which the sensor board 17 is essentially in a longitudinally aligned arrangement relative to the process board 18. The sensor board 17 and the process board 18 are electrically connected, but mechanically decoupled. In this arrangement, the first acoustic sensor 16 for capturing noise from the moving part 3 is held in an external chamber 25 and the second acoustic sensor 16a for capturing ambient noise is held on the outside of the housing 15. When a plurality of acoustic sensors 16, 16a are used, complex noise analyses can be performed.

The sensor devices 6 described in this case have a dedicated data memory. Furthermore, the sensor devices 6 have a dedicated power supply. The sensor devices 6 are secured in position on the apparatus 2 magnetically.

In respect of further advantageous refinements and developments of the inventive teaching, reference is made firstly to the general part of the description and secondly to the patent claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Data processing installation
2 Apparatus having moving parts
3 Moving part
4 Connection point
5 Basic body
6 Sensor device
7 Bridge unit
8 Computer
8a Data capture block
8b Data memory
8c Diagnosis device
8d Comparison module
8e Report module
8f Interface
8g Trigger
8h Synchronization module
8i Message module
8j Forwarding module
9 Control device
9a Apparatus-internal data capture block
9c Apparatus-internal diagnosis device
9d Apparatus-internal comparison module
9e Apparatus-internal report module
9h Apparatus-internal synchronization module
9j Apparatus-internal forwarding module
10 Apparatus-internal memory
11 Apparatus-internal software
12 Central, external memory
13 Internet
14 Radio repeater
15 Housing
16 First acoustic sensor
16a Second acoustic sensor
17 Sensor board
18 Process board
19 Mounting means
20 Top of the housing
21 Underside of the housing
22 Permanent magnet
23 Structure-borne sound transmission body
24 Board
25 External chamber

The invention claimed is:

1. An arrangement for diagnosing a device with moving parts, comprising:
a data processing installation having a computer;
at least one apparatus having a control device, wherein the apparatus has moving parts which are articulated to connection points on a fixed basic body or to further moving parts;
at least one sensor device which is wireless and secured in position on a connection point or on a moving part for capturing physical data from the respective moving part and transmitting said data wirelessly to the computer, wherein the at least one sensor device is configured to capture and transmit accelerations and/or temperatures and/or light and/or torques and/or noise and/or chemical substances in the environment and/or also voltages and/or currents;
means for providing a temporary connection, during operation, between the computer and the control device to control motion sequences of the apparatus and to simultaneously read the data and to capture control device time from the control device such that a time synchronization will be performed between the computer and the control device;

a synchronization module for synchronizing control device time and sensor device times; and a diagnosis device for analyzing the captured data, wherein time intervals and time differences are calculated and are compared with model data.

2. The arrangement as claimed in claim 1, wherein the sensor device is arranged at a marked position provided for a sensor device.

3. The arrangement as claimed in claim 1, wherein the sensor device captures data at a preset challenge rate during operation.

4. The arrangement as claimed in claim 1, wherein the data processing installation comprises:

a bridge unit to which at least one sensor device transmits captured data.

5. The arrangement as claimed in claim 4, wherein the bridge unit is fitted to or integrated in the control device of the apparatus.

6. The arrangement as claimed in claim 4, wherein the bridge unit is fitted to or integrated in the computer.

7. The arrangement as claimed in claim 1, wherein the computer reads data captured by the sensor device and/or configures the sensor device.

8. The arrangement as claimed in claim 1, wherein the computer reads data from the control device and/or configures the control device during operation.

9. The arrangement as claimed in claim 1, wherein the computer contains software for analyzing the data received from the sensor device and/or data from the control device for outputting diagnosis results from the data.

10. The arrangement as claimed in claim 1, wherein the computer captures data from a plurality of sensor devices in different apparatuses and/or reads data from a plurality of control devices in different apparatuses, duirng operation.

11. The arrangement as claimed in claim 1, wherein the computer configures a plurality of sensor devices in different apparatuses and/or configures a plurality of control devices in different apparatuses, during operation.

12. The arrangement as claimed in claim 1, wherein the computer is a mobile computer.

13. The arrangement as claimed in claim 1, wherein the data processing installation comprises:

a central, external memory to which the computer transmits data captured by the sensor device and/or data from the control device via an Internet connection.

14. The arrangement as claimed in claim 1, wherein data from the control device and/or from the sensor device are transmitted by a radio repeater.

15. The arrangement as claimed in claim 1, wherein the sensor device has a housing in and/or on which one or more sensors are held.

16. The arrangement as claimed in claim 15, comprising:
at least one acoustic sensor for capturing noise, which is held in or on the housing.

17. The arrangement as claimed in claim 16, comprising:
a first acoustic sensor for capturing noise from the moving part, which is held in the housing; and
a second acoustic sensor for capturing ambient noise, which is held on the housing.

18. The arrangement as claimed in claim 17, comprising:
at least one process board, which is held in the housing.

19. The arrangement as claimed in claim 18, wherein the sensor device has a dedicated data memory.

20. The arrangement as claimed in claim 18, which the sensor device has a dedicated power supply.

21. The arrangement as claimed in claim 20, wherein the sensor device is secured in position magnetically or mechanically.

* * * * *